Nov. 21, 1961 S. A. CORREN ET AL 3,009,980
NEGATIVE ELECTRODE
Filed Feb. 9, 1959
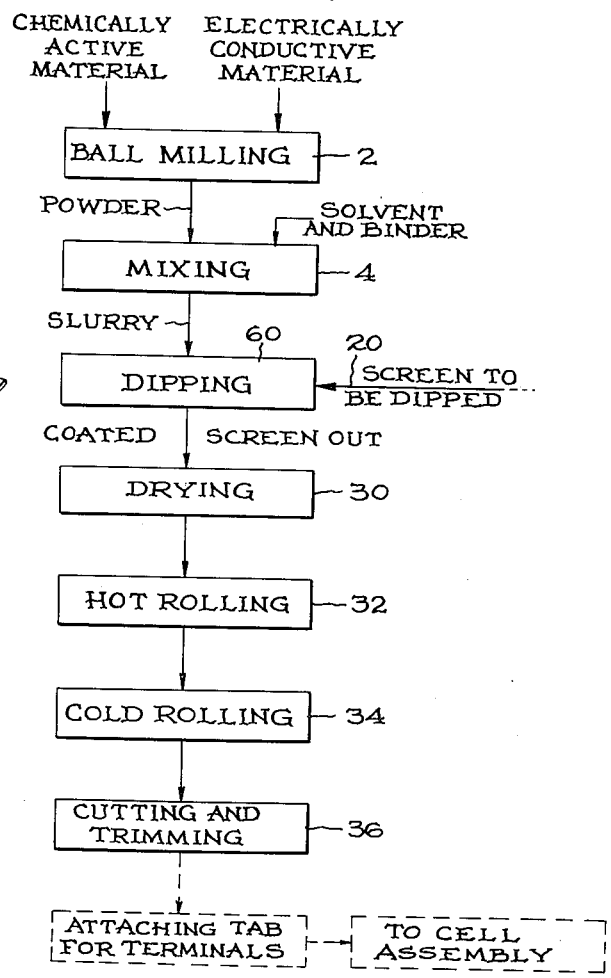
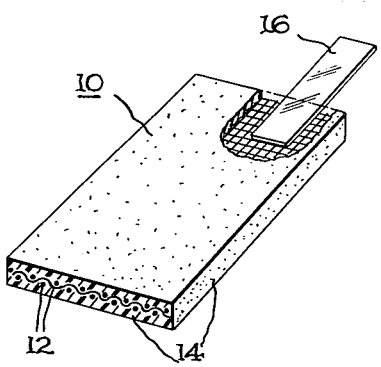
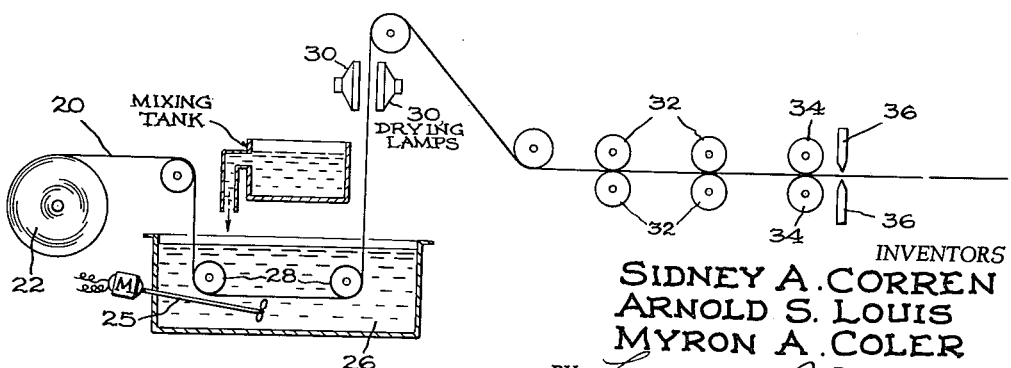
INVENTORS
SIDNEY A. CORREN
ARNOLD S. LOUIS
MYRON A. COLER
BY Lawrence J. Field
ATTORNEY

3,009,980
NEGATIVE ELECTRODE

Sidney A. Corren, 163 Cherry St., Katonah, N.Y.; Arnold S. Louis, Bronx, N.Y. (87 Southgate Ave., Hastings on Hudson, N.Y.); and Myron A. Coler, 56 Secor Road, Scarsdale, N.Y.
Filed Feb. 9, 1959, Ser. No. 792,059
3 Claims. (Cl. 136—34)

This invention relates to electrodes for secondary batteries, and more particularly to a novel negative electrode and methods of manufacturing same.

A number of processes are known for the production of electrodes for secondary batteries. In one such process which has found favor in recent years, a plate formed by sintering specially prepared carbonyl nickel powder is subjected to a vacuum to remove gases from the pores and then impregnated with solutions of reactive materials from which the active ingredients must then be precipitated in the voids in the sintered plate, after which the plates must be washed prior to further treatment. To produce electrodes with reproducible properties by such prior art processes it has been found necessary to carefully control the porosity in the sintered plate and to repeat the impregnation of the plate and the electrolytic precipitation of the desired compounds and subsequent washing several times and to proceed in a precise and tedious fashion in order to insure thorough and complete impregnation of the sintered base.

One object of the invention is the provision of a simple, economical and practical method for producing negative plates with reproducible properties adapted to yield a battery with a high current capacity expressed as ampere hours per unit of volume.

Another object of the invention is to provide a method which is suited to either batch operation or continuous production.

Still another object of the invention is to provide a process by means of which electrodes of controlled thicknesses varying from very thin to moderately thick dimensions, may be produced.

Still another object of the invention is to provide an electrode-making process in which a desired pore structure may be obtained by building up the electrode through repeated application of a liquid containing the electrode materials dispersed therein, after which the liquid is removed prior to the next application of the liquid containing electrode material dispersed therein.

An additional object of the invention is to provide a novel battery plate comprising a homogeneous mixture of electrically conductive material, chemically active material and an amount of binder insufficient to completely coat the particles of said materials present in the mixture, said mixture being suitably disposed about an electron sink.

A further object of the invention is to provide a thin battery plate which is both flexible and rugged and which is particularly suited to use in batteries with special requirements as to shape or size.

Still another object is to provide an electrode having a high output current density.

These and other objects will become more apparent from the description which follows.

In the drawings:

FIGURE 1 is a perspective view taken partially in section and showing one type of negative plate prepared according to the present invention;

FIGURE 2 is a flow sheet of a batch procedure for producing the negative plate of FIGURE 1; and FIGURE 3 is a diagrammatic view of an apparatus for carrying out the method of FIGURE 2 as a continuous process.

For purposes of illustration, the process will be described as it applies to the production of cadmium plates, but it will be apparent to those skilled in the art, that the same procedure is applicable to the preparation of plates of other suitable materials.

Briefly, in accordance with the present invention, we first prepare an intimate mixture of the chemically active and electrically conductive materials, both as finely divided ingredients; we then form a solution of a binder and disperse the mixture therein; and we then deposit the resulting dispersion as a thin layer about an electron sink. After removal of the liquid, the resultant article is trimmed to the desired configuration and then preferably subjected to pressure exerted to reduce the thickness to the thickness of the ultimate plate. Thereafter the plate is given a final trim, if required. At any appropriate stage of the process, tabs, serving as terminals, may be affixed to the plate electrodes.

It will be appreciated that one or more steps of the process, as set forth above, bears a superficial resemblance to many patented prior art methods for the manufacture of electrodes for batteries, but it should be noted that the several steps constituting the process described in detail below, have been found to cooperate in a specific manner. Thus the formation of the electrode has been found to be most advantageously accomplished by forming a slurry from an intimate mixture of chemically active material and electrically conductive material, preferably in a ball mill, and a solution of a somewhat limited amount of binder in the liquid vehicle. Furthermore, the use of a wet process and liquid removal subsequent thereto, carried out so that the electrode is built up in stages, results in pore structures which are particularly desirable as to both amount and distribution and which permit the use of relatively low pressures in the finishing of the plate.

FIGURE 1 represents a negative electrode produced by our process. As shown, the electrode 10 comprises an electron collector 12 about which there is disposed a homogeneous mixture 14 of chemically active material, electrically conductive material and binder material and to which there is secured a terminal tab 16.

The following example will serve to further illustrate the preparation of the electrode of FIGURE 1 by the batch process of FIGURE 2.

*(1) Preparation of mixture of chemically active and electrically conductive materials*

Into a four-liter vessel there were charged 300 grams of cadmium oxide powder, 660 grams of cadmium metal powder and 1000 grams of steel balls, ⅛ inch in diameter. By turning the vessel at 60 r.p.m. for a considerable time, the steel balls were caused to mill the other constituents and to form a uniform blend of particles less than 50 microns in diameter. After thorough intermixing, e.g. after about 10 hours, the contents of the vessel were screened through a ten-mesh screen whereby the balls were separated from the remainder of the contents.

*(2) Incorporation of mixture with electron sink*

About 346 grams of the ball-milled mixture were mixed in a Waring Blendor with a solution consisting of about 6.9 grams of VYHH which is a copolymer of polyvinyl chloride and polyvinyl acetate, dissolved in 115 cc. of methyl ethyl ketone. The resulting slurry was transferred to an open tank. A twenty-mesh nickel screen about 4.5″ by 1.8″, conforming roughly to the desired plate size and intended to serve as a source of electrons on charging and as a collector of electrons on discharging, was immersed into the mixture, withdrawn and air dried; reimmersed, withdrawn and air dried and immersed in the mixture for a third time, in order to yield a product having the desired weight of active ingredients;

that is, for example, a plate containing about 12 grams of material. To insure uniformity, the contents of the dip tank were reblended in a Waring Blendor, run at low speed for ½ minute after each three dips, that is after processing of each three plates. About 20 plates were prepared from the batch. After air drying, the plates were ready for the finishing portion of the process.

(3) Plate finishing

The first step in finishing the plates, each of which now consisted of a nickel screen grid on which about 12 grams of the prepared mixture had been deposited, was to trim each plate to approximately the final size which was 4.25" x 1.75". Thereafter each plate was heated to about 100° C. in an oven and passed through a rolling mill to reduce the existing thickness of between 0.030–0.040 inch to a final thickness of 0.019 inch after about 10 passes, as more fully described in a copending application Serial No. 791,856 filed of even date herewith. The plates were reheated after each pass and were calipered between passes to insure that a uniform rolling schedule was maintained from one plate to the next. It was found that the reheating could be omitted if heated rolls were used. Plates of the dimensions indicated were possessed of great flexibility and could be readily bent or otherwise deformed to assume various configurations.

After a final pass between unheated rolls, the plates were trimmed to the final size, if such trimming was necessary. Then selected areas of the plates were cleaned with Unalum 60 (alumina) for attachment of terminals to the grid. In the batch process described, these terminal portions may be attached to the grid at any convenient stage of the process. Thus the plate may be formed with a tab approximately 0.25" x 2" x 0.006" by welding a tab onto the grid prior to dipping; or the terminal tab may be attached at a later stage in the process. After assembly in a battery, the plates were ready for charging and service.

FIGURE 3 is a schematic representation of one manner of producing the plates of FIGURE 1 by a continuous process. In the embodiment shown, 40 x 60 mesh nickel screen 20 is payed out from a supply roll 22 and led into one or more tanks containing a stirrer 25 for a slurry 26 consisting of chemically active material and electrically conductive material dispersed in a solution of a binder material, similar to that described above. The screen is led past an idler roll 28 or other suitable guide means and thence out of tank through a draining region to and past a liquid removal station, shown as a battery of infra-red lamps 30. After removal of the liquid the flexible web passes through a stand of heated rolls 32. Unheated rolls 34 are provided for the final pass. After the last roll stand, means 36 are provided for severing the electrode material to convenient lengths. Before incorporation of the plates into a battery they are trimmed, if necessary, by conventional means (not shown) and terminals are affixed to each plate by other known means. After assembly and charging the plates are ready for service in secondary batteries.

In the foregoing outline, the procedure has been described in terms of a specific example. It will be evident that other proportions and even other ingredients may be substituted for those disclosed, without departing from the invention and that instead of 20 mesh nickel screen, other suitable materials may be employed as a source of electrons on charging and as a collector of electrons on discharging.

For example, instead of the specified mixture of cadmium and cadmium oxide in the proportions stated in the foregoing example, satisfactory results have been obtained with electrodes in which the relative proportions of cadmium to cadmium oxide have been varied between 100% cadmium plus 0% CdO to 20% cadmium, plus 80% CdO by weight. A preferred ratio is one consisting of 69 parts by weight of cadmium and 31 parts by weight of CdO. Other electrically conductive materials may be employed in place of the cadmium. Thus, iron, nickel, silver, and acetylene black and other forms of carbon, have each been used in place of cadmium to furnish the desired electrical conductivity in the plate composition, and mixtures of these ingredients have been used for the same purpose. Other chemically reactive materials may be used in place of the cadmium oxide, according to the particular battery specifications to be satisfied. Thus, powdered iron oxide, or other reactive materials alone or in combination may be used in the process. With cadmium oxide as the chemically reactive material, cadmium is preferred and it appears that it has the advantage of supplying additional activity and possibly improving the retention of capacity on repeated cycling. With iron oxide, powdered iron would be preferred.

Both the cadmium and cadmium oxide or their equivalents are preferably finely divided. In the specific example above the cadmium used was minus 325 mesh (Tyler Standard) and all of the cadmium oxide was an impalpable powder which was passed through a 60 mesh screen prior to ball milling to break up any large agglomerates of the very fine material. Powdered materials 80 mesh or finer have been used with satisfactory results.

Furthermore, other nickel wire screens, electroformed nickel screen 0.004" thick, 20 holes to the inch, nonwoven screens, perforated metal sheets, metal paper formed of metal fibers, and even loosely matted fibers have each been used.

The relative proportions of binder to the other constituents may be varied considerably, provided the amount of binder is kept below that which would completely insulate the individual particles of cadmium and cadmium oxide. With polyvinyl chloride-polyvinyl acetate copolymer, from 1% to 4% by weight of polyvinyl chloride-polyvinyl acetate copolymer for each 99% to 96% by weight of finely divided cadmium and cadmium oxide in the particle sizes stated above gave good results, about 2:98 being preferred. Any one or more of a large number of alkali-resistant polymers have been used satisfactorily as binders including polystyrene, polymethylmethacrylate, polyvinyl chloride and the like, each of which was used with a suitable known solvent for the polymer.

The amount of liquid added to the system depends principally on the method chosen for applying the resulting slurry to the electron sink material. For dipping, described in the specific example above of our preferred practice, a ratio of 21 parts by weight of methyl ethyl ketone in 100 parts by weight of slurry has been found suitable. The active constituents may be applied by repeated applications of the wet mixture, for example spraying, or by other conventional coating procedures such as doctoring or painting.

Instead of the slurry of cadmium and cadmium oxide, described above, a mixture of the following constituents:

Cadmium oxide 30% by weight
Carbonyl iron 66% by weight
Polyvinyl chloride-polyvinyl acetate copolymer 4% by weight was prepared as a slurry in sufficient methyl ethyl ketone to yield a creamy consistency. Finished plates from this mixture were produced according to the continuous process described in FIGURE 3.

It will be seen that a wet process has been devised for producing negative electrodes without the use of sintering. The negative electrodes produced possessed great flexibility and ruggedness. The cadmium-cadmium oxide plates described have been found to retain their physical and electrical integrity over a wide range of operating conditions. Neither the charging rate nor the discharge rate is critical. Typical electrodes produced by the above processes had capacities of at least 6 ampere hours per cubic inch and could be rolled up or otherwise formed into intricate shapes in specialized applications, requiring same.

We claim:

1. A process for producing negative electrodes for secondary batteries which comprises: preparing an intimate mixture consisting of at least one finely divided chemically active material selected from the group consisting of cadmium oxide and iron oxide and at least one finely divided electrically conductive material selected from the group consisting of cadmium, iron; nickel, silver and carbon; dissolving an organic binder in a volatile organic liquid; dispersing the intimate mixture in said dissolved binder to form a slurry wherein the proportions of binder to mixture are between 1% and 4% of binder for each 99% to 96% of mixture the amount of said binder being insufficient to completely coat the particles of finely divided chemically active and electrically conductive materials in said mixture; depositing a thin layer of said slurry on a foraminous metallic supporting member; removing the volatile organic liquid present from said layer, by drying said layer in air, thereby depositing an intimate mixture of binder and finely divided chemically active and electrically conductive materials as a porous layer on said metallic supporting member; coating the article resulting after removal of the volatile organic liquid with additional amounts of said slurry; air drying the coating to remove the volatile organic liquid therefrom, and repeating said successive additional coating and air drying until the desired weight of coating has been deposited on said metallic support; and thereafter compressing said porous layer an amount sufficient to substantially diminish the thickness of said porous layer while retaining the pore structure obtained by building up the electrode through repeated applications of said slurry.

2. The process of claim 1 wherein the first intimate mixture comprises about 69% cadmium metal and 31% cadmium oxide, by weight.

3. The negative electrode produced by the process of claim 1.

References Cited in the file of this patent

UNITED STATES PATENTS

| 2,738,375 | Schlotter | Mar. 13, 1956 |
| 2,811,572 | Fischbach et al. | Oct. 29, 1957 |
| 2,820,078 | Salauze | Jan. 14, 1958 |
| 2,902,530 | Eisen | Sept. 1, 1959 |

FOREIGN PATENTS

| 792,464 | Great Britain | Mar. 26, 1958 |
| 751,725 | Great Britain | July 4, 1956 |